(12) United States Patent
Gomyo et al.

(10) Patent No.: US 6,378,209 B1
(45) Date of Patent: Apr. 30, 2002

(54) METHOD OF PRODUCING FLUID BEARING DEVICE

(75) Inventors: Masato Gomyo; Kazushi Miura; Ryuhei Matsuda; Tokio Tago; Takehiko Yazawa, all of Nagano (JP)

(73) Assignees: Kabushiki Kaisha Sankyo Seiki Seisakusho, Nagano (JP); Seagate Technology Inc., Scotts Valley, CA (US)

( * ) Notice: Subject to any disclaimer, the term of this patent is extended or adjusted under 35 U.S.C. 154(b) by 0 days.

(21) Appl. No.: 09/556,481

(22) Filed: Apr. 21, 2000

(30) Foreign Application Priority Data

Apr. 21, 1999 (JP) .............................................. 11-113349

(51) Int. Cl.$^7$ .......................... B21D 53/10; F16C 32/06
(52) U.S. Cl. ................... 29/898.02; 29/898.1; 384/114; 384/115; 384/118; 384/120
(58) Field of Search ........................... 29/898.02, 898.1; 384/100–124, 118, 119, 478; 184/5, 5.1

(56) References Cited

U.S. PATENT DOCUMENTS

| | | | | |
|---|---|---|---|---|
| 4,343,378 A | * | 8/1982 | Bremer | |
| 4,892,418 A | * | 1/1990 | Asada et al. | 384/124 |
| 5,558,443 A | * | 9/1996 | Zang | 384/119 |
| 5,570,908 A | * | 11/1996 | Merritt | |
| 5,658,080 A | * | 8/1997 | Ichiyama | 384/119 |
| 5,707,154 A | * | 1/1998 | Ichiyama | 384/120 |
| 5,791,784 A | * | 8/1998 | Ichiyama | 384/124 |
| 6,181,039 B1 | * | 1/2001 | Kennedy et al. | 384/110 |
| 6,190,049 B1 | * | 2/2001 | Rose | 384/121 |
| 6,217,218 B1 | * | 4/2001 | Inoue et al. | 384/119 |

FOREIGN PATENT DOCUMENTS

WO            99/34125       *  7/1999

* cited by examiner

*Primary Examiner*—S. Thomas Hughes
*Assistant Examiner*—Eric Compton
(74) *Attorney, Agent, or Firm*—Sughrue Mion, PLLC

(57) ABSTRACT

In a dynamic pressure bearing device which has a shaft (3), a bearing (10) rotatable relative to the shaft (3), and capillary seal portions (13, 14) for holding a lubricating fluid (15) in a bearing clearance and in which the shaft (3) and the bearing (10) are relatively rotatably supported by dynamic pressure of the lubricating fluid (15) in the bearing clearance is scattered by centrifugal force so that the lubricating fluid (15) is kept in a constant quantity by the capillary seal portions (13, 14).

16 Claims, 5 Drawing Sheets

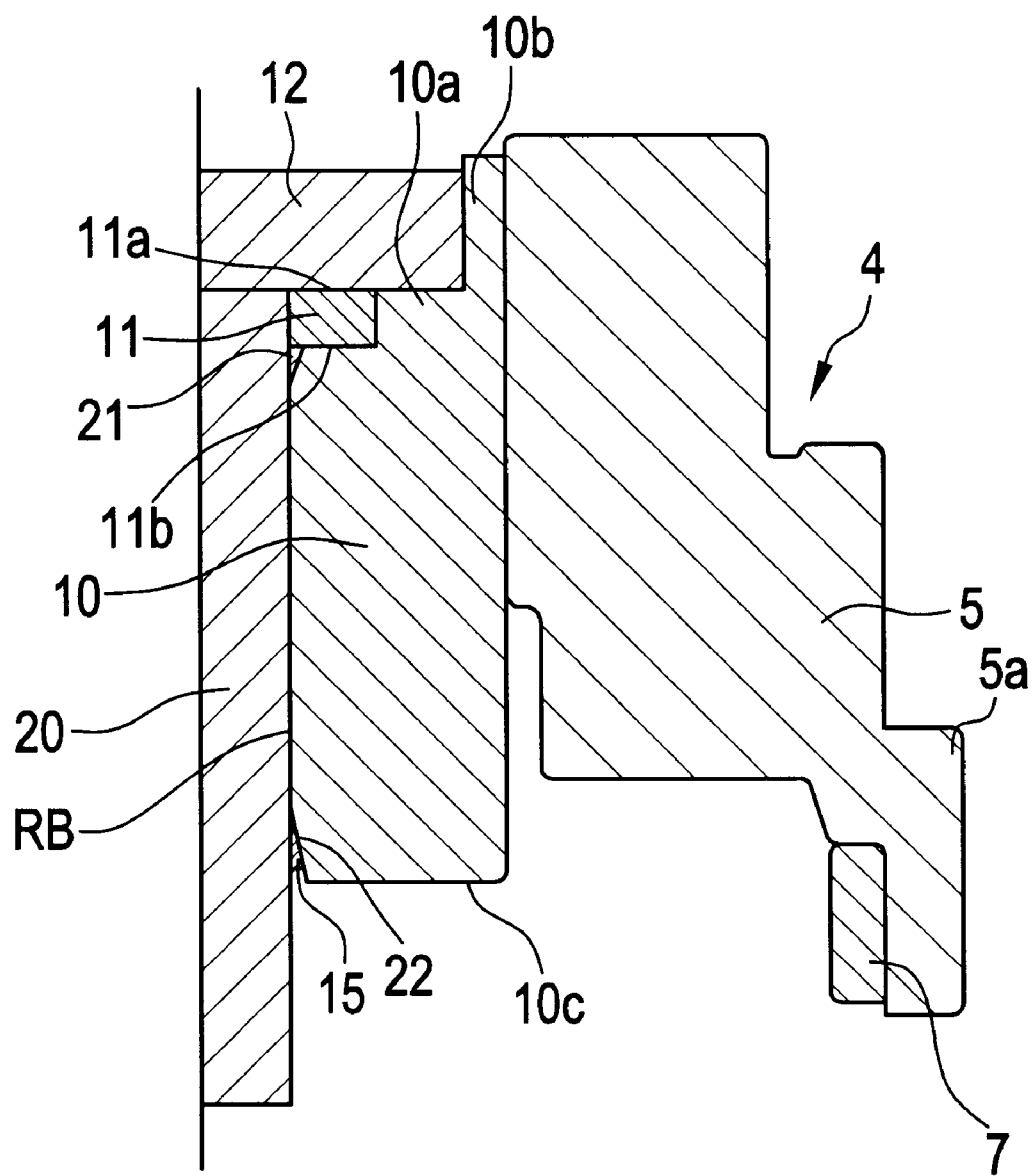

METHOD OF PRODUCING FLUID BEARING DEVICE

BACKGROUND OF INVENTION

1. Field of Invention

The present invention relates to a method of producing a fluid bearing device configured such that dynamic pressure is generated in a lubricating fluid so that a rotating member is supported relative to a stationary member by the dynamic pressure.

2. Related art

Recently, various fluid bearing devices using dynamic pressure of fluid have been proposed for various devices such as motors, particularly in accordance with high-speed rotation. In this type of fluid bearing device, a bearing surface on a stationary member side and a bearing surface on a rotating member side are disposed opposed to each other. A groove for generating dynamic pressure is formed in at least one side of the opposite bearing surfaces. A predetermined lubricating fluid such as oil filled in between the opposite surfaces of the rotating member and the stationary member, that is, in a bearing clearance, is pressurized by a pumping action of the dynamic pressure generating groove when the rotating member is rotated. As a result, dynamic pressure is generated by activation of the lubricating fluid so that the rotating member is rotatably supported by the dynamic pressure.

The lubricating fluid filled in the clearance is held in the bearing clearance by capillary force of capillary seal portions each having an inclined taper surface. Moreover, the lubricating liquid is prevented from being scattered out of the bearing clearance. If the lubricating fluid is exhausted by vaporization, sufficient bearing performance cannot be obtained and reliability, or the like, is worsened. Therefore, the capillary seal portions hold a predetermined quantity of the lubricating fluid inclusive of the predicted quantity of vaporization.

If the quantity of the lubricating fluid inclusive of the predicted quantity of vaporization is, however, too large, fluid leakage occurs to stain the circumference. This is a fatal defect particularly in a hard disk drive device (HDD), or the like, requiring a high cleanness. In the background art, therefore, a surplus lubricating fluid is absorbed by use of capillary force of cloth, or the like, or sucked by an air vacuum, or the like, to thereby stabilize the quantity of the lubricating fluid and hold the lubricating fluid.

In the aforementioned method, however, it is difficult to adjust the fine quantity of the lubricating fluid to a predetermined value, so that it is difficult to stabilize the quantity of the lubricating fluid surely and hold the lubricating fluid. Moreover, a device, or the like, for removing a surplus lubricating fluid is required, so that increase in cost is brought about.

SUMMARY OF INVENTION

The present invention has been achieved to solve the problem in the background art and an object thereof is to provide a method of producing a fluid bearing device in which a lubricating fluid can be held while the quantity of the lubricating fluid is stabilized surely.

According to the present invention, there is provided a method of producing a fluid bearing device which comprises: a sleeve having a bearing hole; a shaft inserted in the bearing hole; a lubricating fluid interposed in a clearance between the sleeve and the shaft; and capillary seal portions formed in opening portions of the bearing hole and for holding the lubricating fluid; the shaft and the sleeve being supported by dynamic pressure of the lubricating fluid so as to be rotatable relative to each other; wherein the method comprises the step of scattering a surplus of the lubricating fluid in the clearance by centrifugal force, whereby the lubricating fluid is kept in a constant quantity by the capillary seal portions.

By the aforementioned method, the lubricating fluid in the clearance can be held stably and surely. Hence, the life of the fluid bearing device can be elongated. Moreover, the lubricating fluid can be prevented from leaking out when the fluid bearing device is used. Hence, environmental pollution in and around the fluid bearing device can be avoided.

BRIEF DESCRIPTION OF DRAWINGS

FIG. 5 is a sectional view of a right half showing a further embodiment.

DETAILED DESCRIPTION OF PREFERRED EMBODIMENTS

Figure 1:
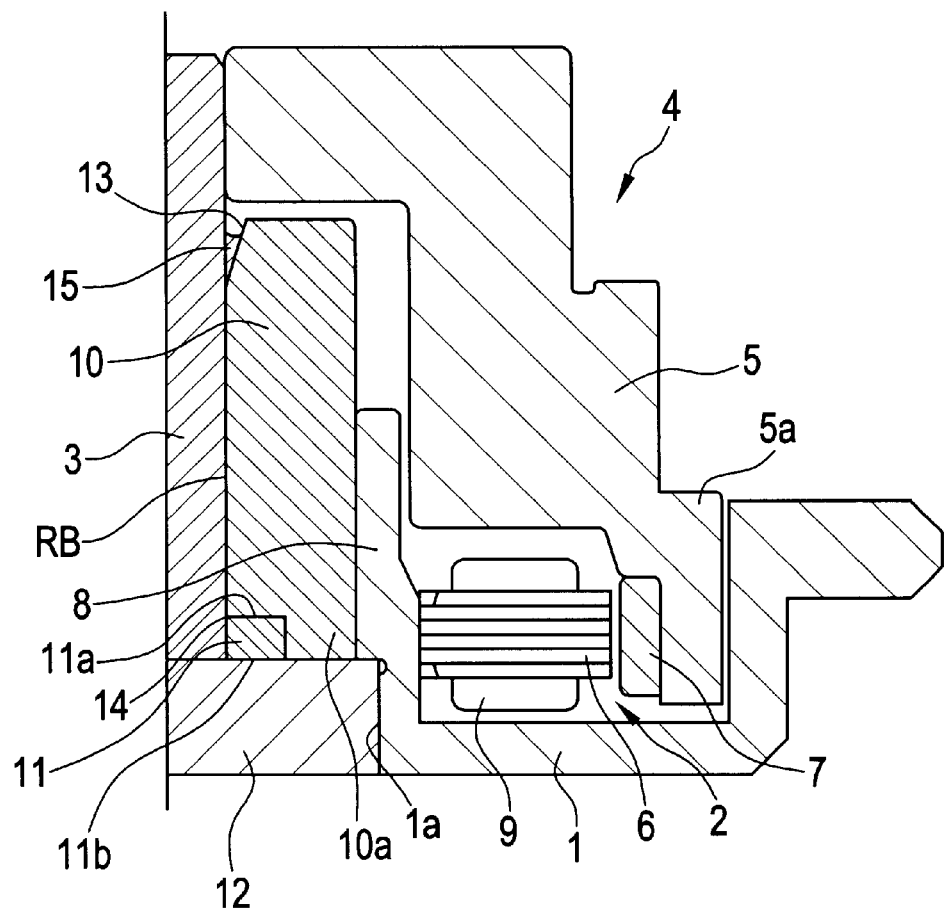
FIG. 1 is a sectional view of a right half showing an embodiment of the present invention.

An embodiment of a fluid bearing device to which the present invention is applied will be described below with reference to the drawings. FIG. 1 shows a section of a right half of a rotating shaft type motor as a fluid dynamic pressure bearing device to which the present invention is applied. As shown in FIG. 1, the motor is constituted mainly by a stator set 2 as a stationary member assembled on a frame 1 made of an aluminum material, or the like, and a rotor set 4 as a rotating member supported rotatably relative to the stator set 2.

The rotor set 4 has a hub 5 which is shaped like a stepped hollow cylinder and attached to an upper end portion of a rotating shaft 3 integrally therewith. The hub 5 is provided for supporting a disk. A drive magnet 7 is attached to a lower inner circumferential surface of an outer cylinder portion 5*a* of the hub 5 so as to be opposite to a stator core 6 which will be described later.

The stator set 2 has a stator core 6. The stator core 6 is attached to an outer circumference of a support holder 8 which is shaped like a hollow cylinder and integrated with the frame 1. Protrusive pole portions of the stator core 6 are wound with winding wires 9 respectively. The stator core 6 is opposite to the drive magnet 7.

A cylindrical sleeve 10 is attached on an inner circumference of the support holder 8 so as to be rotatable relative to the rotation shaft 3. The sleeve 10 has a bearing hole in its center. A radial dynamic pressure bearing portion RB, which serves as a bearing surface for generating dynamic pressure, is formed on an inner circumferential surface of the bearing hole. By the radial dynamic pressure bearing portion RB, the rotation shaft 3 and the hub 5 integrated with the rotation shaft 3 can be rotated relative to the sleeve 10.

An annular protrusion 10*a* is formed at a lower end of the sleeve 10. A ring-like thrust plate 11, which constitutes two thrust dynamic pressure bearing portions 11*a* and 11*b*, is fixed to a lower end portion of the rotation shaft 3 in the inside of the protrusion 10*a*. As shown in FIG. 1, the thrust plate 11 is clamped through a slight space between a bottom surface located in the inside of the protrusion 10*a* of the sleeve 10 and an upper surface of a counter plate 12 fitted into a center hole 1*a* of the frame 1. Hence, the two thrust dynamic pressure bearing portions 11*a* and 11*b* are formed between respective opposite surfaces.

Figure 2:
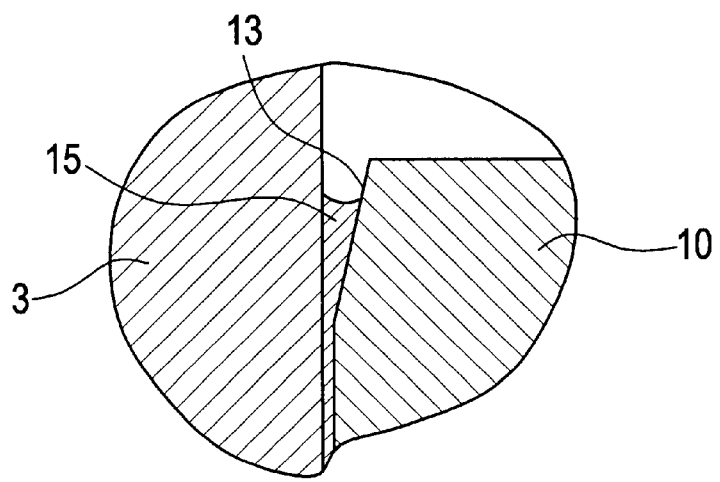
FIG. 2 is a partly enlarged sectional view showing the periphery of a capillary seal portion applied to the aforementioned embodiment.

Further, as shown in FIG. 1, capillary seal portions 13 and 14 each having an inclined taper surface are formed in inner circumferential surfaces of upper and lower opening portions, respectively, in the bearing hole of the sleeve 10. As shown in FIG. 1, the inclined taper surface of the capillary seal portion 13 located on the upper side is formed so as to be axially larger than the inclined taper surface of the capillary seal portion 14. FIG. 2 is an enlarged view showing the periphery of the capillary seal portion 13.

A lubricating fluid 15 for dynamic pressure bearing is continuously filled in a clearance between the upper capillary seal portion 13 and the lower capillary seal portion 14 and held by the capillary seal portions 13 and 14 so as not to leak out. That is, an inner circumferential surface of the radial dynamic pressure bearing portion RB constitutes a non-contact slide portion through the lubricating fluid 15 with respect to an outer circumferential surface of the rotating shaft 3, so that a radial dynamic pressure interface is constituted by the inner circumferential surface of the radial dynamic pressure bearing portion RB and the outer circumferential surface of the rotating shaft 3. For example, an ester or poly-α-olefin lubricating oil is used as the lubricating fluid 15.

Figure 7A:
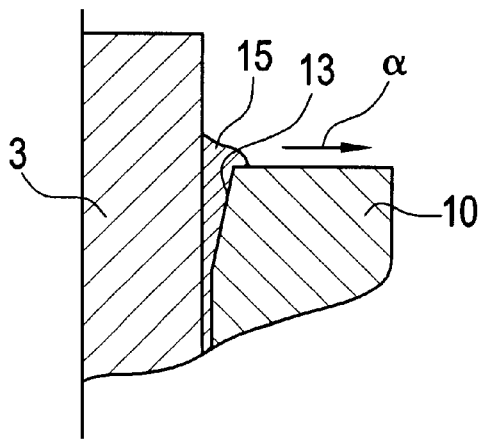
FIGS. 7(*a*) and 7(*b*) are operational views showing a lubricating fluid which can be applied to the present invention.
Figure 7B:
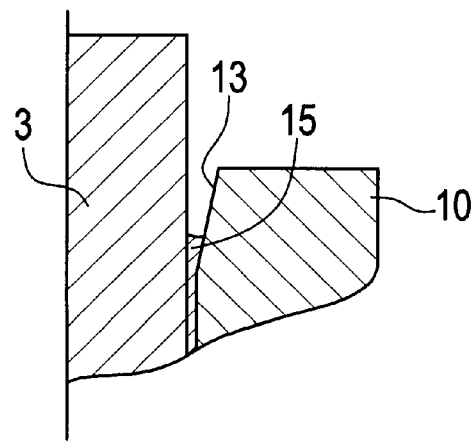

As shown in FIG. 7(*a*), the clearance is filled with a superfluous quantity of the lubricating fluid 15 over the quantity inclusive of the predicted quantity of vaporization. A surplus of the lubricating fluid 15 is scattered by centrifugal force which will be described later, so that a constant quantity of the lubricating fluid 15 inclusive of the quantity of vaporization is held stably by the capillary seal portions 13 and 14. The centrifugal force is generated by rotation of the rotating shaft 3 and the sleeve 10 together with each other or by rotation of the sleeve 10 in the condition that the rotating shaft 3 is stationary.

Figure 8:
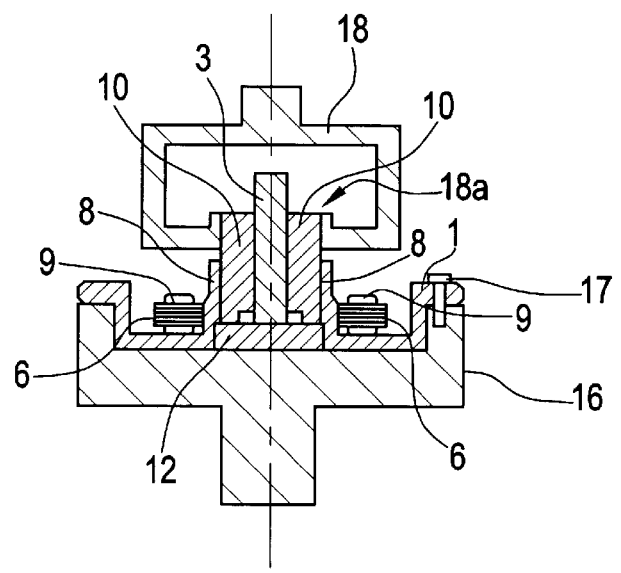
FIG. 8 is a frontal sectional view showing an embodiment of the present invention.

That is, in the case where the centrifugal force is to be generated by rotation of the rotating shaft 3, the sleeve 10 and the frame 1 together with each other, for example, as shown in FIG. 8, the frame 1 is integrally mounted onto a rotor 16 by means of screws 17, or the like, while the clearance is filled with a superfluous quantity of the lubricating fluid over the quantity inclusive of the predicted quantity of vaporization. Then, the frame 1, the sleeve 10 and the rotating shaft 3 are integrally rotated together with the rotor 16. In this occasion, the rotating shaft 3 may be integrally connected to the rotor 16 or to the sleeve 10 by suitable means not shown. Even in the case where such connection is not made, the rotating shaft 3 rotates on the basis of the viscosity of the lubricating fluid with the rotation of the frame 1 and the sleeve 10.

Rotational speed for generating the centrifugal force is set to be higher than the maximum working rotational speed of the fluid bearing device. For example, 2.5-inch HDD motors are classified into types of 4200 rpm, 5400 rpm, etc. according to the maximum working rotation speed. For example, 3.5-inch HDD motors are classified into types of 5400 rpm, 7200 rpm, 10000 rpm, etc. according to the maximum working rotational speed. The rotor 16 is rotated at a rotational speed higher than the maximum working rotational speed. For example, the rotor is preferably rotated at a speed higher by at least 10% than the maximum working rotational speed. Hence, even in the case where the fluid bearing device is used at the maximum working rotational speed, the lubricating fluid 15 is not scattered so that a constant quantity of the lubricating fluid 15 inclusive of the quantity of vaporization is held stably in the clearance by the capillary seal portions 13 and 14. Moreover, the quantity of the lubricating fluid 15 can be set delicately by adjustment of the rotational speed for generating the centrifugal force.

Figure 9:
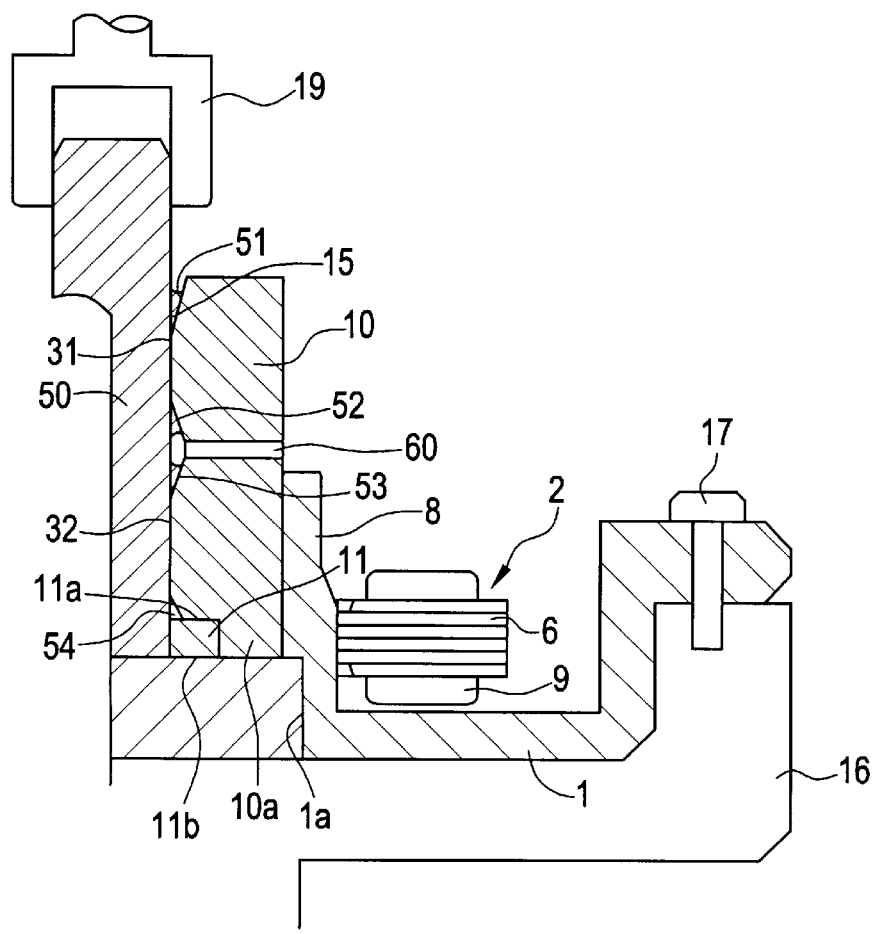
FIG. 9 is a sectional view of a right half showing a further embodiment.

On the other hand, in the case where the centrifugal force is to be generated by rotation of the sleeve 10 in the condition that the rotating shaft 50 is made stationary, for example, as shown in FIG. 9, the frame 1 is attached onto the rotor 16 by means of screws 17, or the like, in the condition that a rotating shaft 50 is fixed by a fixture jig 19 while the clearance between the rotating shaft 50 and the sleeve 10 is filled with a superfluous quantity of the lubricating fluid over the quantity inclusive of the predicted quantity of vaporization. Then, the sleeve 10 is rotated integrally with the rotor 16. Also in this case, the rotational speed is set to be higher than the maximum working rotational speed of the fluid bearing device in the same manner as in the embodiment shown in FIG. 8.

By the centrifugal force generated in the aforementioned manner, a surplus of the lubricating fluid 15 is scattered from the capillary seal portion 13 in the direction reverse to centripetal force, that is, in the direction of moving away from the center of rotation as shown by the α-direction in FIG. 7(*a*) Because the inclined taper surface of the upper capillary seal portion 13 is formed so as to be axially larger than the inclined taper surface of the lower capillary seal portion 14 as described above, a surplus of the lubricating fluid 15 is scattered from the inclined taper surface of the upper capillary seal portion .13 in the α-direction. Because the surplus of the lubricating fluid 15 is scattered by centrifugal force in the aforementioned manner, a constant quantity of the lubricating fluid 15 inclusive of the predicted quantity of vaporization is held stably in the clearance by the capillary seal portions 13 and 14 as shown in FIG. 7(*b*) when the rotor 16 is stopped.

Incidentally, the ambient temperature in the case where the lubricating fluid 15 is scattered to stabilize the quantity of the lubricating fluid to a constant value is set to be higher than the upper limit of the working temperature of the fluid bearing device. When, for example, the upper limit of the working temperature of the fluid bearing device is 60° C., the ambient temperature is set to be higher (for example, about 70° C.) by at least 10% than the upper limit of the working temperature by a heater, or the like. By setting the ambient temperature in the aforementioned manner, the viscosity of the lubricating fluid 15 in the clearance is reduced so that the surplus of the lubricating fluid can be scattered effectively. Hence, the reliability of the fluid bearing device in an ordinary working state can be heightened and the bearing performance thereof can be enhanced.

Preferably, a scatter prevention member is provided for preventing the scattered superfluous lubricating fluid 15 from being scattered to the outside. FIG. 8 shows a hollow box 18 provided with a hole 18a, as an example of the scatter prevention member. As shown in FIG. 8, an upper portion of the sleeve 10 is inserted in the hole 18a of the box 18 through a slight gap. Accordingly, the superfluous lubricating fluid 15 scattered by the centrifugal force is received in the box 18, so that the device and its periphery are not polluted by the scattered superfluous lubricating fluid 15. Incidentally, the scatter prevention member may be discarded to be replaced by a new one after use or may be cleaned to be reused. It is not necessary to rotate the scatter prevention member.

As described above, according to the aforementioned embodiment, a surplus of the lubricating fluid 15 is scattered by centrifugal force so that the lubricating fluid 15 is kept in a constant quantity by the capillary seal portions 13 and 14. Hence, the lubricating fluid 15 can be held in the clearance stably and surely.

Another embodiment of the present invention will be described below. FIG. 5 is a sectional view showing the configuration of a part of a stationary shaft type motor. As shown in FIG. 5, the motor is constituted mainly by a stator set as a stationary member assembled on a frame side not shown, and a rotor set 4 as a rotating member assembled from the upper side in FIG. 5 about a stationary shaft 20 with respect to the stator set.

The rotor set 4 has a hub 5 shaped like a stepped hollow cylinder and integrally attached to an outer circumferential surface of the cylindrical sleeve 10 which can rotate relative to the stationary shaft 20. The hub 5 is provided for supporting a disk. A drive magnet 7 is attached to a lower inner circumferential surface of an outer cylinder portion 5a of the hub 5 so as to be opposite to a stator core provided in a predetermined stator-side position not shown. The stationary shaft 20 is inserted in a bearing hole of the sleeve 10.

A radial dynamic pressure bearing portion RB, which serves as a bearing surface for generating dynamic pressure, is formed in an inner circumferential surface of the bearing hole of the sleeve 10. By the interposition of the radial dynamic pressure bearing portion RB, the hub 5 integrally attached to the outer circumferential surface of the sleeve 10 can be rotated relative to the stationary shaft 20.

An annular protrusion 10a is formed at an upper end of the sleeve 10. An annular protrusion 10b is further formed on an outer circumference of the protrusion 10a. A ring-like thrust plate 11, which constitutes two thrust dynamic pressure bearing portions 11a and 11b, is disposed in the inside of the protrusion 10a so as to be fixed to an upper end portion of the stationary shaft 20. As shown in FIG. 5, the thrust plate 11 is clamped through a slight space between an upper surface located in the inside of the protrusion 10a of the sleeve 10 and a bottom surface of a counter plate 12 provided in the inside of the protrusion lob. Hence, the two thrust dynamic bearing portions 11a and 11b are formed between respective opposite surfaces.

Further, as shown in FIG. 5, capillary seal portions 21 and 22 each having an inclined taper surface are formed in inner circumferential surfaces of upper and lower end portions of the sleeve 10, respectively. As shown in FIG. 5, the inclined taper surface of the capillary seal portion 22 located on the lower side is formed so as to be axially larger than the inclined taper surface of the capillary seal portion 21. Accordingly, as will be described later, a surplus of the lubricating fluid 15 is scattered from the capillary seal portion 22 in a direction reverse to centripetal force, that is, in a direction of moving away from the center of rotation.

Further, a bottom surface 10c of the sleeve 10 located on the lubricating fluid-scattering direction side of the capillary seal portion 22 is subjected to surface treatment so that the bottom surface 10c has the property of absorbing the scattered superfluous lubricating fluid 15.

The lubricating fluid 15 for dynamic pressure bearing is continuously filled in the clearance between the capillary seal portions 21 and 22, so that the lubricating fluid 15 is held by the capillary seal portions 21 and 22. That is, an inner circumferential surface of the radial dynamic pressure bearing portion constitutes a non-contact slide portion through the lubricating fluid 15 with respect to an outer circumferential surface of the stationary shaft 20, so that a radial dynamic pressure interface is constituted by the inner circumferential surface of the radial dynamic pressure bearing portion RB and the outer circumferential surface of the stationary shaft 20.

The clearance is filled with a superfluous quantity of the lubricating fluid 15 over the quantity inclusive of the predicted quantity of vaporization. A surplus of the lubricating fluid 15 is scattered by centrifugal force, so that a constant quantity of the lubricating fluid 15 inclusive of the predicted quantity of vaporization is held stably by the capillary seal portions 21 and 22. The centrifugal force is generated by rotation of the sleeve 10 and the stationary shaft 20 together with each other in the condition that the hub 5 provided on the outer circumference of the sleeve 10 is connected to the rotor 16 or by rotation of the hub 5 and the sleeve 10 together with each other in the condition that the stationary shaft 20 is fixed. Although this embodiment is not particularly shown, it is to be understood by referring to an example shown in FIGS. 8 and 9 that this embodiment can be carried out easily. That is, though FIGS. 8 and 9 show the case where the sleeve 10 is rotated in the condition that the rotor 16 is connected to the frame 1, FIG. 5 shows the case where the sleeve 10 is rotated in the condition that the hub 5 in place of the frame 1 is connected to the rotor 16. Incidentally, also in this case, the rotational speed for generating the centrifugal force is preferably set to be higher than the maximum working rotational speed of the fluid bearing device and the temperature at the time of the generation of the centrifugal force is preferably set to be higher than the working temperature of the fluid bearing device.

By the centrifugal force generated in the aforementioned manner, a surplus of the lubricating fluid 15 is scattered from the capillary seal portion 22 in a direction reverse to centripetal force, that is, in a direction of moving away from the center of rotation. Since the inclined taper surface of the capillary seal portion 22 is formed so as to be axially larger than the inclined taper surface of the capillary seal portion 21 as described above, a surplus of the lubricating fluid 15 is scattered in the aforementioned direction from the inclined taper surface of the capillary seal portion 22 located on the lower side and along the bottom surface 10c of the sleeve 10. As described above, the bottom surface 10c of the sleeve 10 is, however, subjected to the surface treatment so that the bottom surface 10c can absorb the scattered superfluous lubricating fluid 15. Accordingly, the scattered superfluous lubricating fluid 15 is absorbed by the bottom surface 10c of the sleeve 10, so that the device and its periphery are not polluted. Incidentally, an absorbent member is provided so as not to be an obstacle to bearing performance.

As described above, a surplus of the lubricating fluid 15 is scattered by centrifugal force so that a constant quantity of lubricating fluid 15 inclusive of the predicted quantity of vaporization is held stably in the clearance by the capillary seal portions 21 and 22.

Figure 6:
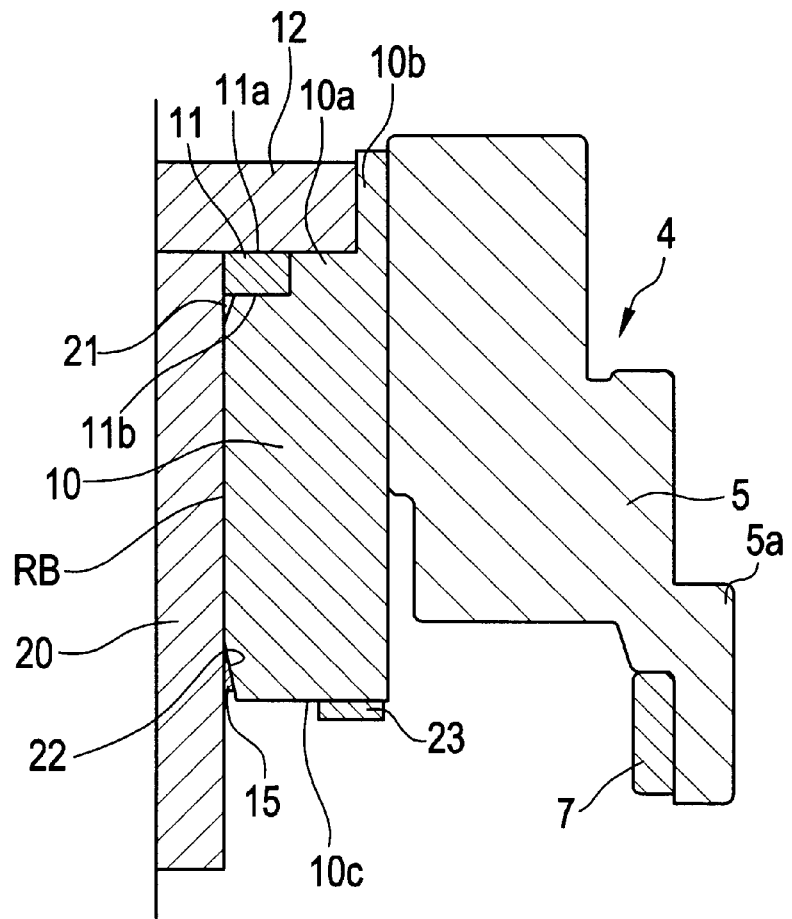
FIG. 6 is a sectional view of a right half showing a further embodiment.

In the embodiment shown FIG. 5, the bottom surface 10c of the sleeve 10 is subjected to the surface treatment so that the bottom surface 10c serves as an absorbent member for absorbing the scattered superfluous lubricating fluid 15. Alternatively, as shown in FIG. 6, an absorbent material 23 such as felt maybe provided on the bottom surface 10c of the sleeve 10 located on the lubricating fluid-scattering direction side so that the absorbent material 23 absorbs the scattered superfluous lubricating fluid 15.

Although the above description has been made upon a fluid bearing device of the type in which the lubricating fluid in the clearance does not move axially largely when the shaft and the sleeve are rotated relative to each other, there may be provided a fluid bearing device of the type in which the lubricating fluid in the clearance moves axially largely when the shaft and the sleeve are rotated relative to each other. In the latter type fluid bearing device, a surplus of the lubricating fluid is scattered by centrifugal force generated by rotation of the sleeve in the condition that the shaft is fixed. This is because the lubricating fluid does not move in spite of rotation of the shaft and the sleeve together with each other so that it is difficult to carry out the operation of scattering the surplus of the lubricating fluid according to the present invention. An embodiment of the fluid bearing device in which the lubricating fluid in the clearance moves axially will be described below.

Figure 3:
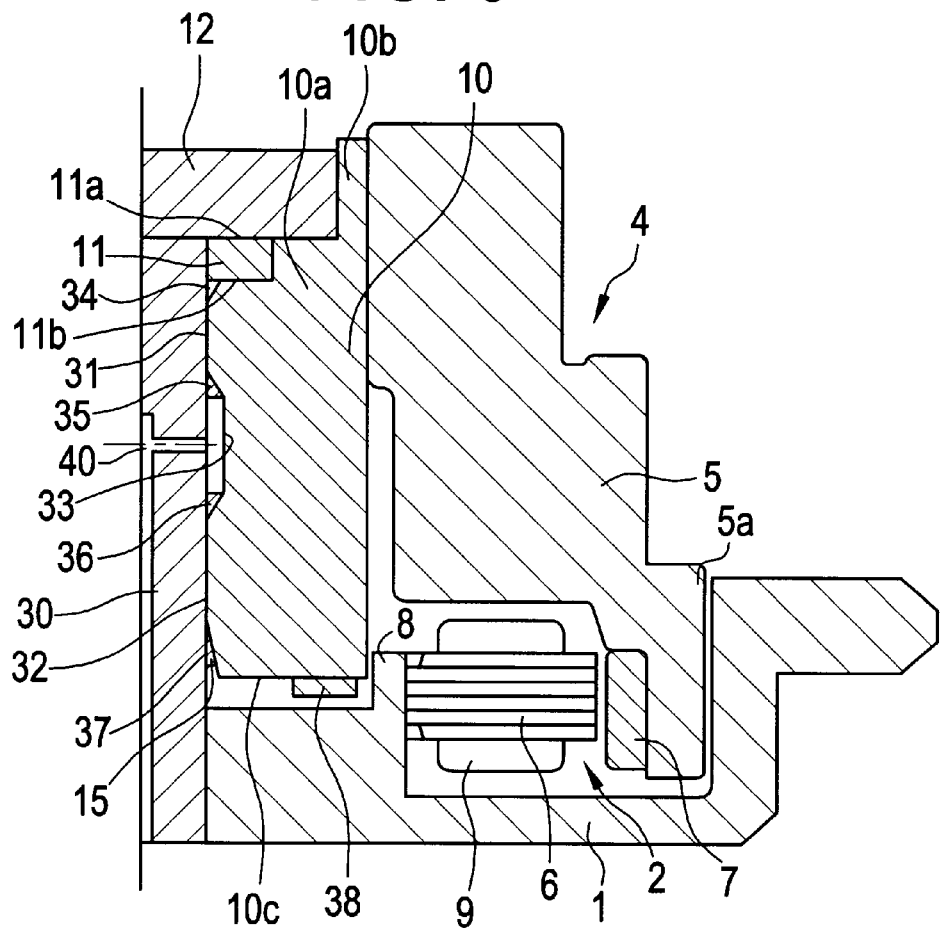
FIG. 3 is a sectional view of a right half showing another embodiment.

FIG. 3 shows a section of a right half of a stationary shaft type motor using the fluid bearing device in which the lubricating fluid in the clearance moves axially. As shown in FIG. 3, the motor is constituted mainly by a stator set 2 as a stationary member assembled on a frame 1 side, and a rotor set 4 as a rotating member assembled so as to be rotatable about a stationary shaft 30 relative to the stator set 2. Parts the same as those in the rotating shaft type motor preliminarily shown in FIG. 1 are referenced correspondingly for the sake of omission of duplicated description.

Two radial dynamic pressure bearing portions 31 and 32, which serve as bearing surfaces for generating dynamic pressure, are formed in an inner circumferential surface of the sleeve 10. As shown in FIG. 3, the radial dynamic pressure bearing portions 31 and 32 are axially separated through an annular cavity 33 formed in the approximately axial center position of the inner circumferential surface of the sleeve 10. By the interposition of the radial dynamic pressure bearing portions 31 and 32, the hub 5 integrally attached to the outer circumferential surface of the sleeve 10 can be rotated relative to the stationary shaft 30.

An annular protrusion 10a is formed at an upper end of the sleeve 10. An annular protrusion 10b is further formed on the outer circumference of the protrusion 10a. A ring-like thrust plate 11, which constitutes two thrust dynamic pressure bearing portions 11a and 11b, is disposed in the inside of the protrusion 10a so as to be fixed to an upper end portion of the stationary shaft 30. As shown in FIG. 3, the thrust plate 11 is clamped through a slight space between an upper surface located in the inside of the protrusion 10a of the sleeve 10 and a bottom surface of a counter plate 12 provided in the inside of the protrusion 10b. Hence, the two thrust dynamic pressure bearing portions 11a and 11b are formed between respective opposite surfaces.

Further, as shown in FIG. 3, capillary seal portions 34, 35, 36 and 37 each having an inclined taper surface are formed in respective upper and lower positions of the radial dynamic pressure bearing portions 31 and 32 on the inner circumferential surface of the sleeve 10. As shown in FIG. 3, the inclined taper surfaces of the capillary seal portions 35 and 37 located on the lower side are formed so as to be axially larger than the inclined taper surfaces of the capillary seal portions 34 and 36. Further, the inclined taper surface of the capillary seal portion 37 is formed so as to be axially larger than the inclined taper surface of the capillary seal portion 35. Accordingly, as will be described later, a surplus of the lubricating fluid 15 is scattered from the capillary seal portion 37 located in the lowermost position, in a direction reverse to centripetal force, that is, in a direction of moving away from the center of rotation. Further, an absorbent material 38 is provided on the bottom surface 10c of the sleeve 10 located on the lubricating fluid-scattering direction side of the capillary seal portion 37.

The clearance is filled with the lubricating fluid 15 for dynamic pressure bearing. By rotation of the sleeve 10 relative to the stationary shaft 30, air in the clearance is released out through an air extraction passage 40 which is formed in the stationary shaft 30 and which has an end communicating with the annular cavity 33. Hence, the lubricating fluid 15 is filled in between the capillary seal portions 34 and 35 and in between the capillary seal portions 36 and 37. That is, inner circumferential surfaces of the radial dynamic pressure bearing portions 31 and 32 constitute non-contact slide portions through the lubricating fluid 15 with respect to an outer circumferential surface of the stationary shaft 30, so that radial dynamic pressure interfaces are constituted by the inner circumferential surfaces of the radial dynamic pressure bearing portions 31 and 32 and the outer circumferential surface of the stationary shaft 30.

After the clearance is filled with an excessive quantity of the lubricating fluid 15 over the quantity inclusive of the predicted quantity of vaporization, a surplus of the lubricating fluid 15 is scattered by centrifugal force so that a constant quantity of the lubricating fluid 15 inclusive of the predicted quantity of vaporization is held in the clearance stably by the capillary seal portions 34, 35, 36 and 37. The centrifugal force is generated by rotation of the sleeve 10 in the condition that the stationary shaft 30 is fixed. Because the sleeve 10 is fixed to the hub 5, the sleeve 10 is rotated when the rotor is rotated in the condition that the hub 5 is joined to the rotor. Also in this case, the rotational speed for generating the centrifugal force is preferably set to be higher than the maximum working rotational speed of the fluid bearing device and the temperature at the time of the generation of the centrifugal force is preferably set to be higher than the upper limit of the working temperature of the fluid bearing device.

By the centrifugal force generated in the aforementioned manner, a surplus of the lubricating fluid 15 is scattered from the capillary seal portion 37 in a direction reverse to centripetal force, that is, in a direction of moving away from the center of rotation. Because the inclined taper surface of the capillary seal portion 37 is formed so as to be axially larger than the inclined taper surfaces of the capillary seal portions 34, 35 and 36 as described above, the surplus of the lubricating fluid 15 is scattered in the aforementioned direction from the inclined taper surface of the capillary seal portion 37 located in the lowermost position and along the bottom surface 10c of the sleeve 10. Because the absorbent material 38 is provided on the bottom surface 10c of the sleeve 10 so as to absorb the scattered superfluous lubricating fluid 15 as described above, the scattered superfluous lubricating fluid 15 is absorbed by the absorbent material 38 so that the device and its periphery are not polluted. Incidentally, the absorbent material 38 is provided so as not to be an obstacle to bearing performance.

As described above, a surplus of the lubricating fluid 15 is scattered by centrifugal force so that a constant quantity of the lubricating fluid 15 inclusive of the predicted quantity of vaporization is held in the clearance stably by the capillary seal portions 34, 35, 36 and 37.

A further embodiment will be described below. FIG. 9 shows a section of a right half of a part of a rotating shaft type motor using the fluid bearing device in which the lubricating fluid in the clearance moves axially. As shown in FIG. 9, the motor is constituted mainly by a stator set 2 as a stationary member assembled on a frame 1 side, and a rotor set (not shown) as a rotating member assembled to be rotatable about a rotating shaft 50 relative to the stator set 2. The rotor set has a hub for supporting a disk. A drive magnet is attached to a predetermined position of an inner circumferential surface of the hub so as to be opposite to a stator core 6. Incidentally, parts the same as those in the motors shown in FIGS. 1 and 3 are referenced correspondingly for the sake of omission of duplicated description.

A cylindrical sleeve 10 rotatable relative to the rotating shaft 50 is attached to an inner circumference of the support holder 8. Radial dynamic pressure bearing portions 31 and 32, which serve as bearing surfaces for generating dynamic pressure, are formed on an inner circumferential surface of the sleeve 10. As shown in FIG. 9, the radial dynamic pressure bearing portions 31 and 32 are axially separated through capillary seal portions 52 and 53 each having an inclined taper surface. By the interposition of the radial dynamic pressure bearing portions 31 and 32, the hub (not shown) integrally attached to the outer circumferential surface of the sleeve 10 can be rotated relative to the rotating shaft 50.

As shown in FIG. 9, capillary seal portions 51, 52, 53 and 54 each having an inclined taper surface are formed in respective upper and lower positions of the radial dynamic pressure bearing portions 31 and 32 on the inner circumferential surface of the sleeve 10. As shown in FIG. 9, the inclined taper surface of the capillary seal portion 51 located in the uppermost position is formed so as to be axially larger than the inclined taper surface of the capillary seal portion 54 located in the lowermost position. Accordingly, as will be described later, a surplus of the lubricating fluid 15 is scattered from the capillary seal portion 51 located in the uppermost position, in a direction reverse to centripetal force, that is, in a direction of moving away from the center of rotation.

The clearance is filled with the lubricating fluid 15 for dynamic pressure bearing. By rotation of the sleeve 10 relative to the rotating shaft 50, air in the clearance is released out through an air extraction passage 60 which is formed in the sleeve 10 and which has an end communicating with the capillary seal portions 52 and 53. Hence, the lubricating fluid 15 is filled in between the capillary seal portions 51 and 52 and in between the capillary seal portions 53 and 54. That is, inner circumferential surfaces of the radial dynamic pressure bearing portions 31 and 32 constitute non-contact slide portions through the lubricating fluid 15 with respect to the outer circumferential surface of the rotating shaft 50, so that radial dynamic pressure interfaces are constituted by the inner circumferential surfaces of the radial dynamic pressure bearing portions 31 and 32 and the outer circumferential surface of the rotating shaft 50.

The clearance is filled with an excessive quantity of the lubricating fluid 15 over the quantity inclusive of the predicted quantity of vaporization. A surplus of the lubricating fluid 15 is scattered by centrifugal force, so that a constant quantity of the lubricating fluid 15 inclusive of the predicted quantity of vaporization is held in the clearance stably by the capillary seal portions 51, 52, 53 and 54. The centrifugal force is generated by rotation of the sleeve 10 in the condition that the rotating shaft 50 is fixed.

Figures 4A, 4B, 4C:
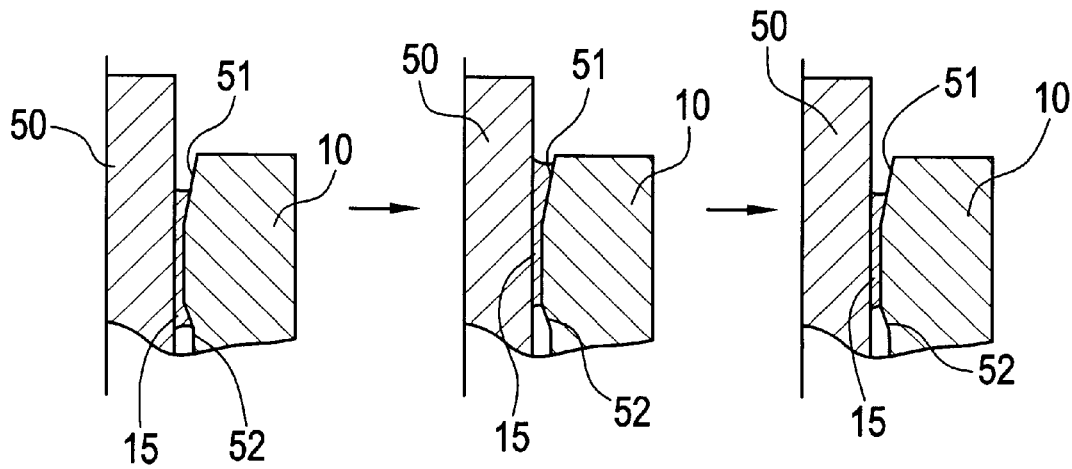
FIGS. 4(*a*) to (*c*) operational views showing a lubricating fluid which can be applied to the present invention.

By the centrifugal force generated in the aforementioned manner, the lubricating fluid 15 in the capillary seal portion 51 is moved up as shown in FIGS. 4(*a*) to (*c*), so that a surplus of the lubricating fluid 15 is scattered from the capillary seal portion 51 in a direction reverse to centripetal force, that is, a direction of moving away from the center of rotation. Because the inclined taper surface of the capillary seal portion 51 located in the uppermost position is formed so as to be axially larger than the inclined taper surface of the capillary seal portion 54 located in the lowermost position as described above, the surplus of the lubricating fluid 15 is scattered in the aforementioned direction from the inclined surface of the capillary seal portion 51. Incidentally, when an upper portion of the sleeve 10 is inserted into the hole 18*a* of the hollow box 18 through a slight gap as shown in FIG. 8, the scattered superfluous lubricating fluid 15 can be received in the box 18 and, accordingly, the device and its periphery are not polluted by the scattered superfluous lubricating fluid 15. Also in this case, the rotational speed for generating the centrifugal force is preferably set to be higher than the maximum working rotational speed of the fluid bearing device and the temperature at this time is preferably set to be higher than the upper limit of the working temperature of the fluid bearing device.

As described above, a surplus of the lubricating fluid 15 is scattered by centrifugal force so that a constant quantity of the lubricating fluid 15 inclusive of the predicted quantity of vaporization is held in the clearance stably by the capillary seal portions 51, 52, 53 and 54. Because the lubricating fluid can be held in the clearance stably and surely in the aforementioned manner, the life of the fluid bearing device can be elongated. Moreover, the lubricating fluid can be prevented from leaking out when the fluid bearing device is used. Hence, environmental pollution in and around the fluid bearing device can be avoided.

What is claimed is:

1. A method for fabricating a fluid bearing device, wherein said fluid bearing device includes a sleeve having a bearing hole, a shaft inserted in said bearing hole, a lubricating fluid interposed in a clearance between said sleeve and said shaft and capillary seal portions formed in opening portions of said bearing hole and for holding said lubricating fluid, and said shaft and said sleeve supported by dynamic pressure of said lubricating fluid so as to be rotatable relative to each other, the method comprising the steps of:

scattering a surplus of said lubricating fluid in said clearance by centrifugal force; and holding said lubricating fluid in a constant quantity by said capillary seal portions, wherein a rotational speed for generating said centrifugal force is higher than a maximum working rotational speed of said fluid bearing device.

2. A method for fabricating a fluid bearing device according to claim 1, wherein said lubricating fluid is scattered by centrifugal force after an absorbent member for absorbing said scattered lubricating fluid is provided around said fluid bearing device.

3. A method for fabricating a fluid bearing device according to claim 1, wherein said centrifugal force is generated by rotation of said shaft together with said sleeve.

4. A method for fabricating a fluid bearing device according to claim 1, wherein said centrifugal force is generated by rotation of said sleeve.

5. A method for fabricating a fluid bearing device, wherein said fluid bearing device includes a sleeve having a bearing hole, a shaft inserted in said bearing hole, a lubricating fluid interposed in a clearance between said sleeve and said shaft and capillary seal portions formed in opening portions of said bearing hole and for holding said lubricating fluid, and said shaft and said sleeve supported by dynamic pressure of said lubricating fluid so as to be rotatable relative to each other, the method comprising the steps of:

scattering a surplus of said lubricating fluid in said clearance by centrifugal force; and holding said lubricating fluid in a constant quantity by said capillary seal portions, wherein an ambient temperature for scattering said lubricating fluid by centrifugal force to stabilize said lubricating fluid into a constant quantity is higher than an upper limit of a working temperature of said fluid bearing device.

6. A method for fabricating a fluid bearing device according to claim 5, wherein said lubricating fluid is scattered by centrifugal force after an absorbent member for absorbing said scattered lubricating fluid is provided around said fluid bearing device.

7. A method for fabricating a fluid bearing device according to claim 5, wherein said centrifugal force is generated by rotation of said shaft together with said sleeve.

8. A method for fabricating a fluid bearing device according to claim 5, wherein said centrifugal force is generated by rotation of said sleeve.

9. A method for fabricating a rotating shaft type fluid bearing device, wherein said rotating shaft type fluid bearing device includes a sleeve having a bearing hole, a frame for holding said sleeve, a shaft inserted in said bearing hole, a lubricating fluid interposed in a clearance between said sleeve and said shaft, capillary seal portions formed in opening portions of said bearing hole and for holding said lubricating fluid, and said shaft supported so as to be rotatably relative to said sleeve by dynamic pressure generated by rotation of said shaft in said lubricating fluid, the method comprising the steps of:

scattering a surplus of said lubricating fluid in said clearance by centrifugal force by rotating a rotor after said lubricating fluid is injected into said clearance sufficiently and said frame is attached to said rotor; and holding said lubricating fluid in a constant quantity by said capillary seal portions, wherein said rotor is rotated at a rotational speed higher than a maximum working rotational speed of said fluid bearing device.

10. A method for fabricating a rotating shaft type fluid bearing device according to claim 9, wherein said frame, said sleeve and said shaft are rotated together with each other when said rotor is rotated.

11. A method for fabricating a rotating shaft type fluid bearing device according to claim 9, wherein a scatter prevention member for preventing said lubricating fluid from being scattered is disposed around said capillary seal portions when said rotor is rotated.

12. A method for fabricating a rotating shaft type fluid bearing device according to claim 9, wherein said frame and said sleeve are rotated together with each other in the condition that said shaft is fixed when said rotor is rotated.

13. A method for fabricating a stationary shaft type fluid bearing device, wherein a stationary shaft type fluid bearing device includes a sleeve having a bearing hole, a shaft inserted in said bearing hole, a hub attached to said sleeve integrally with said sleeve, a lubricating fluid interposed in a clearance between said sleeve and said shaft and capillary seal portions formed in opening portions of said bearing hole and for holding said lubricating fluid, and said sleeve being supported so as to be rotatable relative to said shaft by dynamic pressure generated in said lubricating fluid by rotation of said sleeve, said method comprising the steps of:

scattering a surplus of said lubricating fluid in said clearance by centrifugal force caused by rotating a rotor after said lubricating fluid is injected into said clearance sufficiently and said hub is attached to said rotor; and holding said lubricating fluid in a constant quantity by said capillary seal portions, wherein said rotor is rotated at a rotational speed higher than a maximum working rotational speed of said fluid bearing device.

14. A method for fabricating a stationary shaft type fluid bearing device according to claim 13, wherein said hub, said sleeve and said shaft are rotated together with one another when said rotor is rotated.

15. A method for fabricating a stationary shaft type fluid bearing device according to claim 13, wherein a scatter prevention member for preventing said lubricating fluid from being scattered is disposed around said capillary seal portions when said rotor is rotated.

16. A method for fabricating a stationary shaft type fluid bearing device according to claim 13, wherein said hub and said sleeve are rotated together with one another in the condition that said shaft is fixed when said rotor is rotated.

* * * * *